United States Patent
Wang et al.

(10) Patent No.: US 8,047,488 B2
(45) Date of Patent: Nov. 1, 2011

(54) SUPPORT STAND AND FLAT-PANEL DISPLAY MONITOR USING THE SAME

(75) Inventors: Jin-Xin Wang, Shenzhen (CN); Chao-Zhong Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 149 days.

(21) Appl. No.: 12/426,364

(22) Filed: Apr. 20, 2009

(65) Prior Publication Data

US 2010/0171011 A1    Jul. 8, 2010

(30) Foreign Application Priority Data

Jan. 5, 2009    (CN) .......................... 2009 1 0300051

(51) Int. Cl.
*E04G 3/00*    (2006.01)
(52) U.S. Cl. .................. 248/291.1; 248/371; 248/176.1; 248/185.1; 248/278.1; 248/917; 248/919; 248/922; 248/923; 361/679.21; 361/679.22
(58) Field of Classification Search .................. 248/371, 248/923, 917, 919, 922, 176.1, 185.1, 278.1, 248/291.1; 361/679.21, 679.22
See application file for complete search history.

(56) References Cited

U.S. PATENT DOCUMENTS

| | | | |
|---|---|---|---|
| 6,378,830 B1 * | 4/2002 | Lu ............... | 248/278.1 |
| 6,570,627 B1 * | 5/2003 | Chang ........... | 348/794 |
| 6,601,810 B2 * | 8/2003 | Lee ............. | 248/278.1 |
| 6,698,063 B2 * | 3/2004 | Kim et al. ...... | 16/337 |
| 6,748,625 B2 * | 6/2004 | Lu .............. | 16/285 |
| 6,796,541 B2 * | 9/2004 | Lu .............. | 248/291.1 |
| 6,837,469 B2 * | 1/2005 | Wu et al. ....... | 248/278.1 |
| 7,287,729 B2 * | 10/2007 | Jung et al. ..... | 248/122.1 |
| 7,472,459 B2 * | 1/2009 | Lee et al. ...... | 16/342 |
| 7,567,436 B2 * | 7/2009 | Jeong ........... | 361/679.22 |
| 7,636,133 B1 * | 12/2009 | Hsu ............. | 348/794 |
| 7,735,797 B2 * | 6/2010 | Hu .............. | 248/371 |
| 7,758,000 B2 * | 7/2010 | Hsieh et al. .... | 248/176.1 |
| 7,819,368 B2 * | 10/2010 | Jung et al. ..... | 248/133 |
| 2004/0055114 A1 * | 3/2004 | Lu .............. | 16/340 |
| 2007/0252066 A1 * | 11/2007 | Iwai et al. ..... | 248/372.1 |
| 2009/0166500 A1 * | 7/2009 | Hsu ............. | 248/371 |

* cited by examiner

*Primary Examiner* — Nkeisha Smith
(74) *Attorney, Agent, or Firm* — Altis Law Group, Inc.

(57) ABSTRACT

A support stand includes a supporting leg and a hinge subassembly. The supporting leg includes a connecting portion. The hinge subassembly includes a shaft and a leaf rotatably sleeved on the shaft. The shaft has a connecting portion engaging with the connecting portion of the supporting leg. One of the connecting portions of the supporting leg and the shaft is a connecting slot, and the other one of the connecting portions of the supporting leg and the shaft is a protrusion engaged in the connecting slot, thus fixing the shaft to the supporting leg. A friction is created between the shaft and the leaf.

6 Claims, 3 Drawing Sheets

SUPPORT STAND AND FLAT-PANEL DISPLAY MONITOR USING THE SAME

BACKGROUND

1. Technical Field

The present disclosure generally relates to support stands and, particularly, to a support stand for a flat-panel display monitor.

2. Description of Related Art

Flat-panel display monitors, such as liquid crystal display monitors, offer advantages such as reduced size, smaller weight, and better image quality. A viewing angle of the flat-panel display monitor can be adjusted. A typical hinge is usually applied to make a display screen of the display monitor rotatable relative to a base of the display monitor.

However, the typical hinge often includes a first bracket connected to the base, a second bracket connected to the display screen, a shaft fixed to the second bracket, a stabilizing member fixed to the first bracket, a rotational member fixed to the shaft, a plurality of washers, an elastic member, and a fastening member. The elastic member is compressed to create a force causing the stabilizing member and the rotational member to resist each other, thereby producing a friction force. The friction force maintains the second bracket in any position relative to the first bracket. The first and second brackets have a connecting portion to connect with the base or the display screen, and a pivot portion substantially perpendicular to the connecting portion to be sleeved on the shaft. Therefore, the first and second brackets must be very large, thus increasing a size of the display monitor. In addition, the typical hinge includes too many components making it very complex. The many components also contributes to a large size of the display monitor.

Therefore, a new support stand is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTIONS

Figure 1:
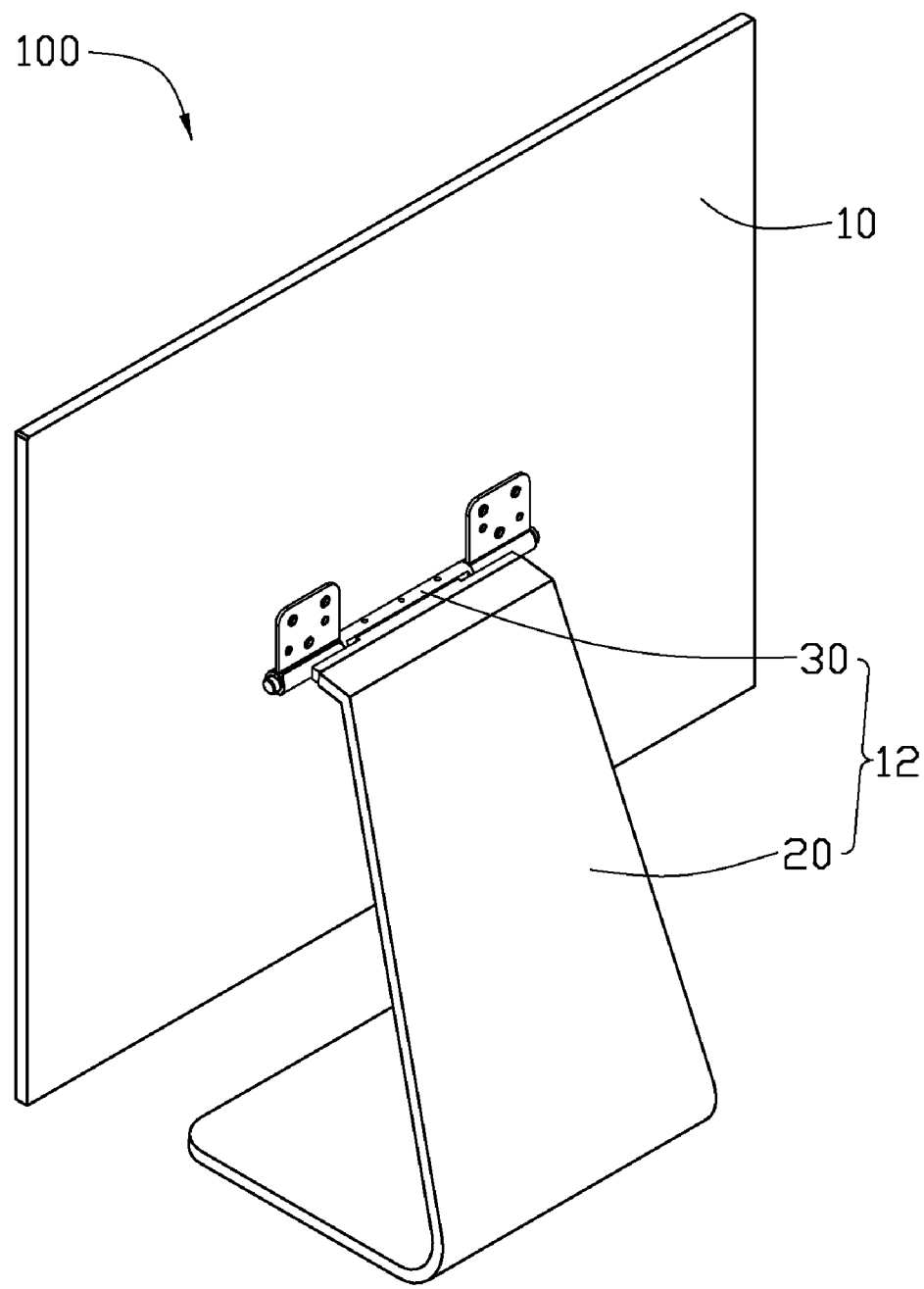
FIG. 1 is a perspective view of an embodiment of a support stand applied in a flat-panel display monitor, the support stand including a hinge subassembly.

Referring to FIG. 1, a support stand of the present disclosure adopted by a liquid crystal display 100 is shown. Alternatively, the support stand may be adopted by other flat-panel display monitors. The liquid crystal display 100 includes a display screen 10 and a support stand 12 holding the display screen 10. The support stand 12 includes a supporting leg 20 and a hinge subassembly 30.

Figure 2:
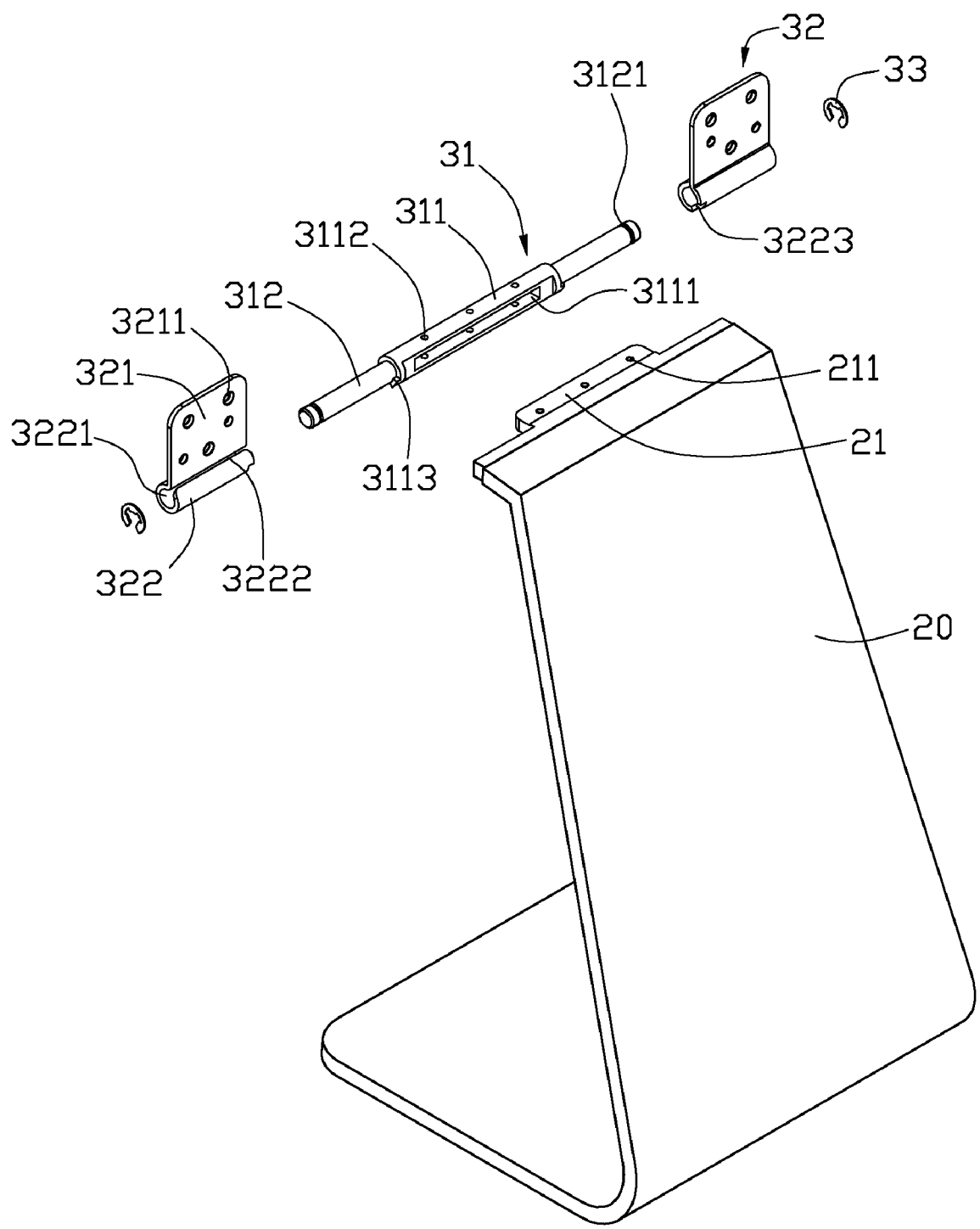
FIG. 2 is an exploded, isometric view of the support stand of FIG. 1.

Referring to FIG. 2, the supporting leg 20 includes a connecting portion 21 formed from an end of the supporting leg 20. The connecting portion 21 may be an elongated protrusion and defines a plurality of fastening holes 211. The hinge subassembly 30 includes a shaft 31, two leaves 32 rotatably sleeved on the shaft 31, and two fastening members 33 engaged at opposite ends of the shaft 31 to prevent the leaves 32 from falling off from the shaft 31.

The shaft 31 includes a mounting portion 311 and two pivot portions 312 extending from opposite ends of the mounting portion 311. The mounting portion 311 defines a connecting slot 3111 and a plurality of fastening holes 3112 extending substantially perpendicular to the connecting slot 3111. In the illustrated embodiment, the mounting portion 311 is a cuboid having flat outside surfaces, because it is easier to define slots and holes on flat surfaces than on curved surfaces. The mounting portion 311 further forms two limiting protrusions 3113, with each limiting protrusion 3113 at opposite ends of the mounting protrusion 311. Each of the pivot portions 312 defines a circular groove 3121 adjacent to an end opposite to the mounting portion 311.

Each of the leaves 32 includes a connecting portion 321 and a substantially cylindrical knuckle portion 322 formed from an end of the connecting portion 321. The connecting portion 321 may be a substantially flat sheet and defines a plurality of fastening holes 3211. The knuckle portion 322 defines a through hole 3221 extending substantially parallel to a cylindrical axis of the knuckle portion 322. The cylindrical sidewall of the knuckle portion 322 defines a slit 3222 extending substantially parallel to, and communicating with, a cylindrical axis of the knuckle portion 322. The knuckle portion 322 further defines a cutout 3223 at an end.

The fastening members 33 may be E-shaped rings for engaging in the grooves 3121 of the pivot portions 312 of the shaft 31.

Figure 3:
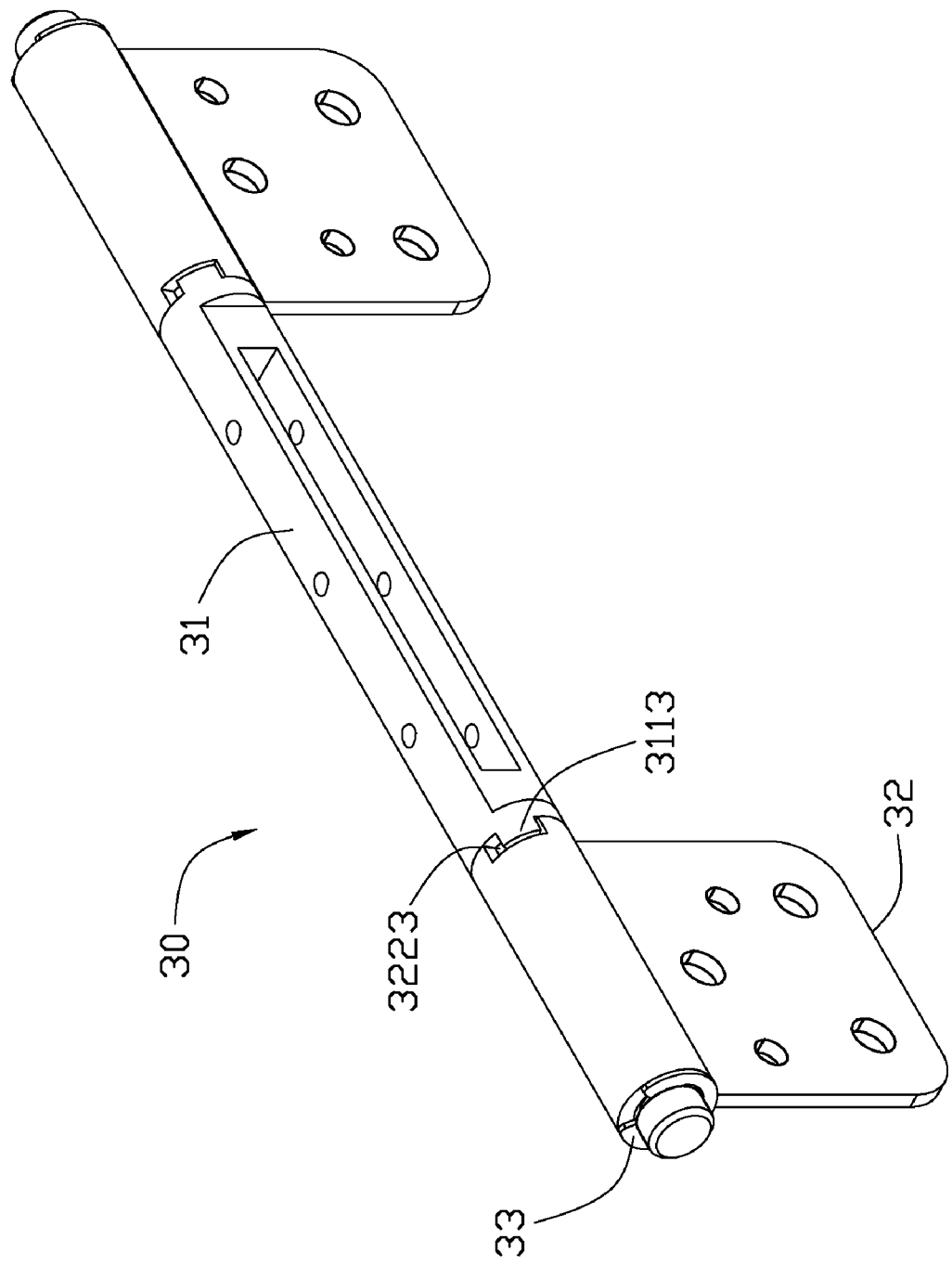
FIG. 3 is an assembled, isometric view of the hinge subassembly of the support stand of FIG. 2.

Referring to FIG. 3, the leaves 32 are rotatably sleeved on the pivot portions 312 of the shaft 31. The limiting protrusions 3113 of the shaft 31 are received in the corresponding cutouts 3223 of the leaves 32, and the limiting protrusions 3113 are slidable in the corresponding cutouts 3223. The slits 3222 of the leaves 32 face opposite directions. The fastening members 33 are engaged in the corresponding grooves 3121 of the shaft 21, thus preventing the leaves 32 from falling off the pivot portions 312 and also preventing the limiting protrusions 3113 from disengaging from the cutouts 3223. The connecting portion 21 is inserted into the connecting slot 3111, and a plurality of bolts (not shown) are engaged in the fastening holes 211, 3112, to fix the shaft 31 to the supporting leg 20.

The display screen 10 can be rotated by overcoming a friction between the shaft 31 and the leaves 32. An engagement of the cutouts 3223 of the leaves 32 and the limiting protrusions 3113 of the shaft 31 determines a rotatable angle of the leaves 32 relative to the shaft 31. When no force is applied on the display screen 10, the friction between the shaft 31 and the leaves 32 maintains the display screen 10 at predetermined positions.

The hinge subassembly 30 of the support stand 12 can facilitate rotating the shaft 31 and the leaves 32. No elastic members or washers are needed in the hinge subassembly 30. In addition, the supporting leg 20 is connected to the hinge subassembly 30 by inserting the connecting portion 21 into the connecting slot 3111 of the shaft 31, thus reducing a size of the support stand 12. Furthermore, the slits 3222 of the leaves 32 face opposite direction. Therefore, the friction force between the shaft 31 and the leaves 32 is relatively steady while the display screen 10 is rotated.

In alternative embodiments, only one leaf 32 may be applied in the support stand 12. In this case, the friction force between the shaft 31 and the leaf 32 may change during rotating. The fastening members 33 may be nuts and ends of the pivot portions 312 define screw threads to engage with the nut. The connecting portion 21 may also be a slot, and the connecting slot 3111 may be a structured connecting portion such as a protrusion.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A support stand, comprising:
a supporting leg comprising a connecting portion; and
a hinge subassembly comprising a shaft and a first leaf rotatably sleeved on the shaft, the shaft having a mounting portion and a connecting portion formed on the mounting portion, the connecting portion engaging with the connecting portion of the supporting leg;
wherein one of the connecting portions of the supporting leg and the shaft is a connecting slot, and an other one of the connecting portions of the supporting leg and the shaft is a protrusion engaged in the connecting slot, thus fixing the shaft to the supporting leg; a friction is created between the shaft and the first leaf;
the mounting portion further forms a limiting protrusion; and the first leaf defines a cutout to slidably receive the limiting protrusion of the mounting portion;
wherein the hinge subassembly further comprises a second leaf rotatably sleeved on the shaft, the shaft further comprises two pivot portions formed from opposite ends of the mounting portion, the first and second leaves are oppositely sleeved on the two pivot portions of the shaft; each of the first and second leaves comprises a connecting portion and a knuckle portion formed from an end of the connecting portion; the knuckle portions of the first and second leaves are sleeved on the pivot portions of the shaft; the mounting portion of the shaft further forms another limiting protrusion, the two limiting protrusions are formed at opposite ends of the mounting portion of the shaft, the second leaf also defines a cutout to slidably receive the other limiting protrusion of the shaft, the two cutouts are respectively defined at corresponding knuckle portions of the first and second leaves; wherein the knuckle portion of each of the first and second leaves defines a slit extending substantially parallel to a longitudinal axis of the knuckle portion; the slits of the first and second leaves face opposite directions.

2. The support stand of claim 1, wherein the connecting portion of the supporting leg is formed at an end of the supporting leg.

3. The support stand of claim 1, wherein the mounting portion of the shaft is a cuboid having flat outside surfaces.

4. The support stand of claim 1, wherein each of the pivot portions of the shaft defines a groove adjacent to an end thereof opposite to the mounting portion; the hinge subassembly further comprises two fastening members engaging in the grooves of the shaft.

5. A flat-panel display monitor, comprising:
a display screen;
a support stand, the support stand comprising:
a supporting leg comprising a connecting portion; and
a hinge subassembly comprising a shaft and a first leaf rotatably sleeved on the shaft, the shaft having a mounting portion and a connecting portion formed on the mounting portion, the connecting portion engaging with the connecting portion of the supporting leg, and the first leaf fixed to the display screen;
wherein one of the connecting portions of the supporting leg and the shaft is a connecting slot, and an other one of the connecting portions of the supporting leg and the shaft is a protrusion engaged in the connecting slot, thus fixing the shaft to the supporting leg; a friction is created between the shaft and the first leaf;
the mounting portion further forms a limiting protrusion; and the first leaf defines a cutout to slidably receive the limiting protrusion of the mounting portion;
wherein the hinge subassembly further comprises a second leaf rotatably sleeved on the shaft; the shaft further comprises two pivot portions formed from opposite ends of the mounting portion, the first and second leaves are oppositely sleeved on the two pivot portions of the shaft; each of the first and second leaves comprises a connecting portion and a knuckle portion formed from an end of the connecting portion; the knuckle portions of the first and second leaves are sleeved on the pivot portions of the shaft;
wherein the mounting portion of the shaft further forms another limiting protrusion, the two limiting protrusions are formed at opposite ends of the mounting portion of the shaft, the second leaf also defines a cutout to slidably receive the other limiting protrusion of the shaft, the two cutouts are respectively defined at corresponding knuckle portions of the first and second leaves; wherein the knuckle portion of each of the first and second leaves defines a slit extending substantially parallel to a longitudinal axis of the knuckle portion; the slits of the first and second leaves face opposite directions.

6. The flat-panel display monitor of claim 5, wherein the connecting portion of the supporting leg is formed at an end of the supporting leg.

* * * * *